United States Patent Office 3,272,466
Patented Sept. 13, 1966

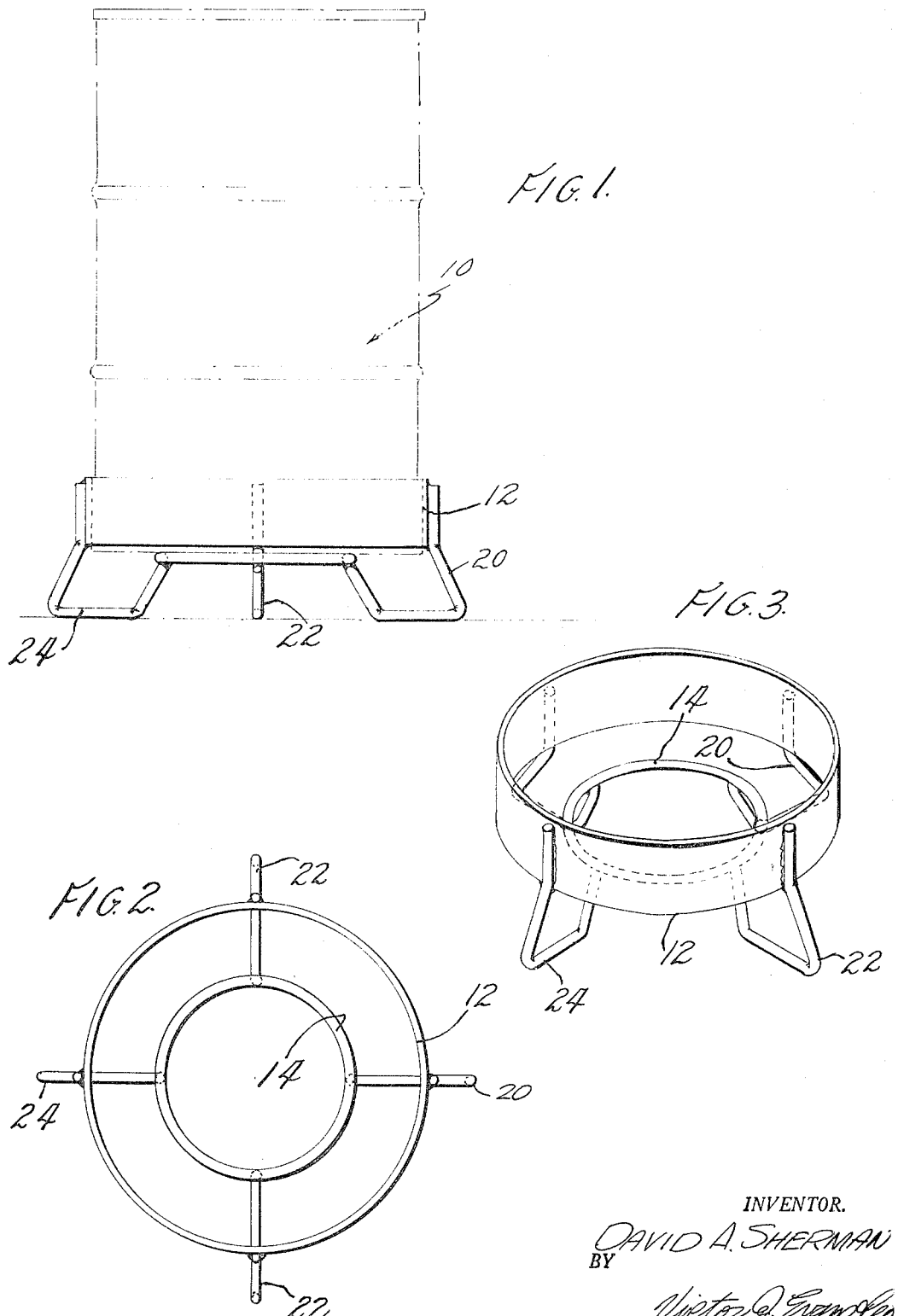

3,272,466
LITTER BARREL MOUNT
David A. Sherman, 1613 S. 8th St., Monroe, La. 71202
Filed Oct. 1, 1965, Ser. No. 492,111
3 Claims. (Cl. 248—146)

The present invention relates to a litter barrel mount of simple construction and improved utility over comparable devices of the prior art, and more particularly relates to a litter barrel mount consisting of a series of hoops and a J-shaped brace member constructed of plastic or metal for maintaining the series of hoops in a supporting relation for the litter barrel.

An object of the invention is to provide a ruggedly constructed litter barrel mount for trash or garbage containers or receptacles, such receptacles being used throughout most communities and park or recreation areas throughout the country, for providing proper and a secure maintenance of the container and for preventing access or pilferage by rodents and animals that would try to overturn the trash or garbage barrel.

A further object of the present invention is to provide ease in picking up litter barrels by means of the improved mount of the present invention.

A further and improved object of the present invention is to provide a neat and sanitary constructed litter barrel mount in which the barrel is substantially precluded from being overturned by animal pilferage and strong winds or other natural causes, so that trash and garbage is not scattered about.

Further objects and advantages and improvements of the invention will become apparent from the following description and claims, and from the accompanying drawings, wherein:

FIGURE 1 is a side elevational view of the litter barrel mount showing a barrel contained therein in dotted line, in accordance with the preferred embodiment of the present invention;

FIGURE 2 shows a plan view of the litter barrel mount shown in FIGURE 1, and

FIGURE 3 shows a generally perspective view of the litter barrel mount in accordance with a preferred embodiment of the present invention.

Referring now to the drawings, there is shown a barrel or litter container 10 for retaining garbage, trash and the like, and in which there is provided a supporting base or mount 12 having a hollow cylindrical metal hoop adapted to extend about the periphery of the base of a litter barrel 10 and having disposed in connective relation to the metal hoop 12 there is a concentrically disposed metal supporting element 14 having a hollow portion 16 of smaller diameter, and in which there is disposed within the radial element the bottom or base side of the litter barrel 10.

There are provided a series of J-shaped metal brace members 20, 22, 24, provided to maintain the spacing of the pair of metal elements in spaced relation from a supporting surface such as the ground, for forming thereby a litter barrel mount.

More particularly, the bottom or supporting radial element 14 may be a supporting metal hoop of smaller diameter than the peripheral metal cylinder 12 so that there is generally provided a cylindrical hoop or metal element 12 supported by the large vertical portion of the J-shaped brace member, and from the small end of the J-shaped brace member there is provided the support means for the supporting metal hoop radial element 14.

Thus, it is seen that there is provided for community and park use a trash or garbage litter barrel container mount for providing improved and proper maintenance of container storage for eliminating an eyesore created by overturned barrels and garbage containers, and by means of the present invention there is provided a mount that prevents animal pilferage and wind scattering of trash, garbage and the like. Thus, the objects and achievements of the present invention are realized by the contemplated construction of the present invention.

While particular embodiments of the invention have been described, it will be understood, of course, that the invention is not limited thereto since many modifications may be made and it is, therefore, contemplated to cover by the appended claims such modifications as fall within the spirit and scope of the invention. The invention having been thus described, what is claimed is:

1. A litter barrel mount comprising a sheet metal hoop of cylindrical construction adapted to extend about a peripheral portion of a base of a latter barrel for supporting it, a supporting metal concentrically disposed element hoop of smaller diameter than said aforementioned hoop and adjacent a lower edge for fitting under the litter barrel, a series of J-shaped metal brace members spatially disposed in sectored relation about said foregoing hoops for maintaining the spacing of the pair of hoops and supporting a litter barrel in forming a litter barrel mount.

2. The invention according to claim 1 wherein said supporting metal hoop is connected to each of the small ends of the J-shaped brace members, and the cylindrical hoops are connected to the large vertical elements of each of the J-shaped brace members.

3. The invention according to claim 2 wherein the outer angled portion of each of the J-shaped brace members extend generally outwardly beyond the peripheral diameter of the pair of metal hoops.

References Cited by the Examiner

UNITED STATES PATENTS

| | | | |
|---|---|---|---|
| 779,924 | 1/1905 | Gommel | 248—146 X |
| 999,202 | 8/1911 | Browning | 248—154 |
| 1,779,867 | 10/1930 | Ahrold | 248—146 |
| 1,830,769 | 11/1931 | Rothermel | 248—154 |
| 2,715,005 | 8/1955 | Hildebrand | 248—154 |
| 2,745,676 | 5/1956 | Scott | 280—47.26 |

CLAUDE A. LE ROY, *Primary Examiner.*